United States Patent

[11] 3,583,205

| [72] | Inventor | Donald Z. Erle |
| | | Long Beach, Calif. |
| [21] | Appl. No. | 743,521 |
| [22] | Filed | July 9, 1968 |
| [45] | Patented | June 8, 1971 |
| [73] | Assignee | Genisco Technology Corporation |
| | | Compton, Calif. |

[54] RATE TABLE
19 Claims, 8 Drawing Figs.

[52] U.S. Cl............................................. 73/1, 308/9
[51] Int. Cl......................................G01c, 17/38
F16c 27/00
[50] Field of Search........................... 308/73, 9,
122, 168; 73/1 D, C

[56] References Cited
UNITED STATES PATENTS

| 2,395,528 | 2/1948 | Anderson | 73/1 |
| 3,193,334 | 7/1965 | Porath | 308/9 |
| 3,223,463 | 12/1965 | Porath | 308/9 |
| 3,440,887 | 4/1969 | Athanas | 308/9 |

OTHER REFERENCES

I. S. A. PROCEEDINGS– Vol. 7– " A New Rate Table for Testing the Performances of Rat Gyroscopes" by M. J. Harpole. 1952. Page 38– 43 relied upon Primary Examiner—Fred C. Mattern, Jr.
Attorney—Fraser and Bogucki ABSTRACT: A rate table apparatus is disclosed in which the turntable is supported by a substantially frictionless, self-centering hydrostatic liquid bearing including concentric shaft and spindle members defining thrust bearing means for reacting to axial loads and radial bearing means for reacting to journal loads, the bearing means being contiguous and in compact spatial relation. Both bearing means share common liquid supply and return conduit systems.

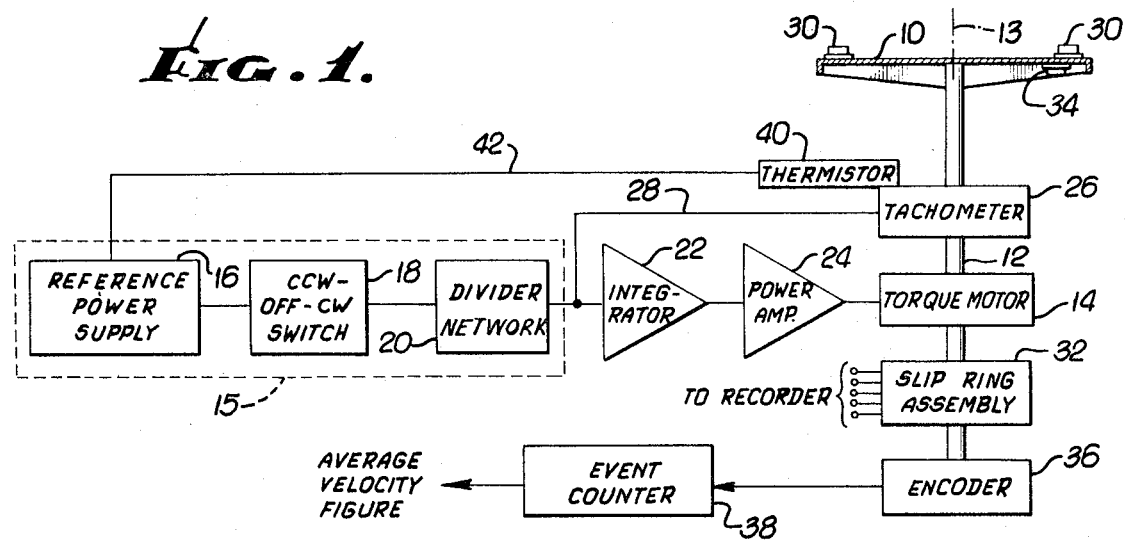
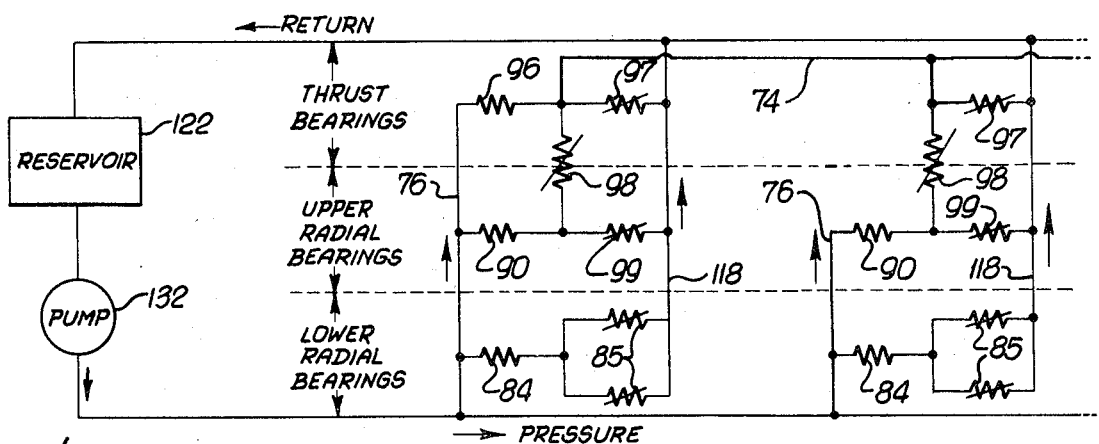
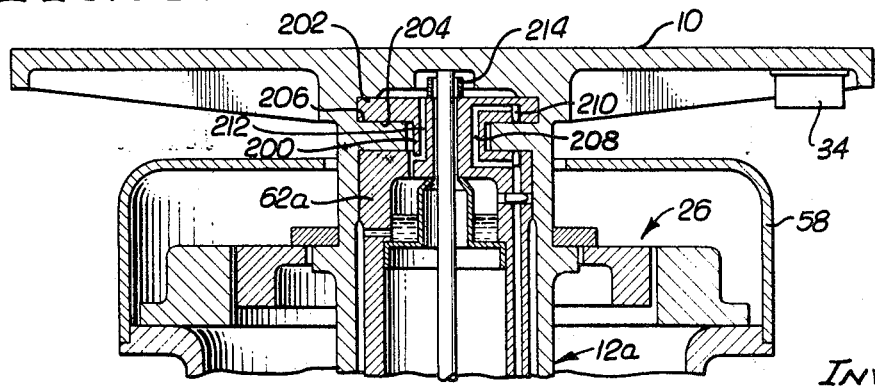

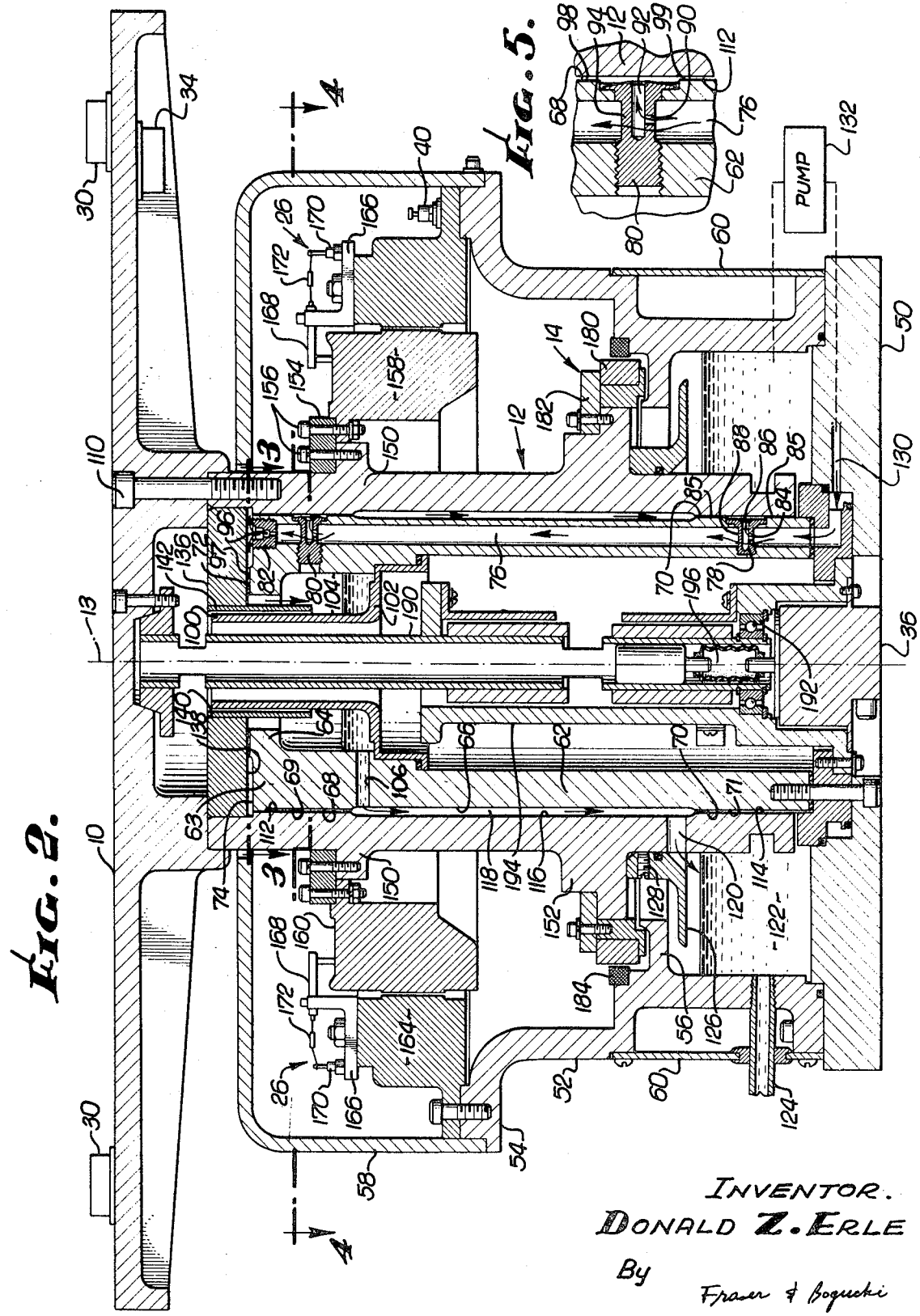

INVENTOR.
DONALD Z. ERLE
By
Fraser & Bogucki
ATTORNEYS.

RATE TABLE

BACKGROUND OF THE INVENTION

The present invention relates generally to rate tables used, for example, for instrument testing and calibration. The invention is more particularly directed to improved rate tables capable of providing extremely constant and precise turntable movements even at very low velocities.

Rate tables are widely used for testing and calibrating instruments such as precision gyros and accelerometers which comprise the basic sensors in high-accuracy inertial guidance systems. Because these sensing instruments are capable of measuring extremely minute dynamic quantities, formidable demands placed on the rate tables used for supplying known inputs to these instruments. Thus, to be compatible with the accuracy of gyros and accelerometers currently in use, a rate table system must be capable of measuring and controlling angular velocities down to the order of 0.001 degree per second.

In order to achieve such magnitudes of measurement and control, it is necessary to reduce to an absolute minimum friction and other disturbing influences introduced by the bearing means supporting the instrument-carrying turntable. In this respect, conventional mechanical bearings utilizing rolling elements have a number of significant disadvantages. These bearings must be ultraprecise even so, they exhibit high-level, unpredictable "breakout" friction characteristics for which compensation cannot be made. Also, running friction varies as a function of load. Furthermore, irrespective of the tolerances observed during manufacture, rotational inaccuracies resulting from eccentricities and other manufacturing errors are always present. These bearings are also susceptible to damage during handling and shipment.

In an effort to overcome the problems associated with mechanical roller and ball bearings, gas bearings have been used for supporting the turntable. Although solutions have thus been provided to some of the problems, notably those stemming from "breakout" friction and running friction, gas bearings have certain undesirable characteristics which introduce various manufacturing and operational limitations. For examples, because the gas film is extremely thin, exceedingly fine tolerances must be observed in the fabrication of the bearing surfaces to preclude any contact between high spots. Because of the initial compression of the gas and its later reexpansion or decompression, undesirable, relatively high-level acoustical noise is constantly present. There is no residual lubrication; thus, should the pressurization system fail or be accidentally disabled, in the absence of an emergency pressurized supply, opposed bearing surfaces, no longer separated by a pressurized supply, opposed bearing surfaces, no longer separated by a pressurized gas film, can come into immediate contact to cause damage to the bearing surfaces. Because of compressibility of the fluid, gas bearings also have inherent, potential instabilities not present, for example, in bearings using liquids.

Hydrostatic liquid bearings furnish many advantages not available from either mechanical or gas bearings. For example, hydrostatic liquid bearings are self-centering, have superior damping characteristics, viscous drag is both predictable and substantially constant and running friction remains substantially constant despite the load as opposed to mechanical bearings.

SUMMARY OF THE INVENTION

Broadly, the present invention provides a rate table system utilizing a novel, simple and substantially frictionless hydrostatic liquid-bearing means for supporting large turntable loads, centrally disposed or eccentric of the turntable axis, both radially and axially and permitting precise control over turntable speeds. The hydrostatic bearing in combination with the rate table system not only provides all of the advantages usually associated with bearings of this type, namely, extremely low breakout and running friction, with a predictable and consistent friction level which is substantially independent of load, but also is compact, self-centering, has a high resonant frequency with damping characteristics superior to both mechanical and gas bearings. The bearing further incorporates features which makes production both simple and less expensive because of efficient component usage and the elimination of the need for tolerances of the precision required in mechanical and gas bearings.

More specifically, in accordance with one example of the invention a rate table apparatus is provided which includes a turntable having a coaxially disposed, depending tubular shaft concentric with a fixed tubular spindle dimensioned for a running fit with the shaft. The spindle and shaft between them define a thrust bearing and a radial bearing proximate the uppermost extremity of the spindle. The thrust and radial bearings are in communication and in close approximation and share a common bearing land and liquid supply and return system, a portion of which system is formed in the wall of the spindle.

The shaft and spindle further define between them a lower radial bearing serviced by the common supply and return system. The upper and lower radial bearings provide moment carrying capability for loads, for example, applied eccentrically of the turntable axis. Because the upper radial bearing is close to the top of the turntable, for a given eccentric load the decentering moment applied to the bearings is relatively small.

In accordance with an alternative embodiment, an upper thrust bearing is provided to react to upwardly directed loads applied to the turntable. In this way thrust loads in either direction are accommodated. The additional thrust bearing is supplied by pressurized liquid through passages extending from the existing common supply passages; likewise, additional discharge conduits are provided for liquid escaping from the upper thrust bearing and communicating with the existing common return system.

BRIEF DESCRIPTION OF THE DRAWINGS

Objects and advantages other than those indicated above will be apparent from the detailed description, below, when read in connection with the accompanying drawings, in which:

FIG. 1 is a block diagram of a rate table system;

FIG. 2 is an elevation view, in cross section, of a rate table apparatus embodying features of the present invention, taken, for example, along the offset plane 2-2 in FIG. 4;

FIG. 5 is an enlarged elevation view, in section, of a portion of FIG. 2 showing details of an orifice plug utilized in the apparatus of the present invention;

FIG. 7 is a schematic diagram of an example of a hydrostatic liquid circuit employed in the apparatus of the present invention; and FIG. 8 is an elevation view, in cross section, of an alternative embodiment of a rate table apparatus in accordance with the present invention.

DETAILED DESCRIPTION OF THE INVENTION

DETAILED DESCRIPTION OF THE INVENTION

Figure 4:
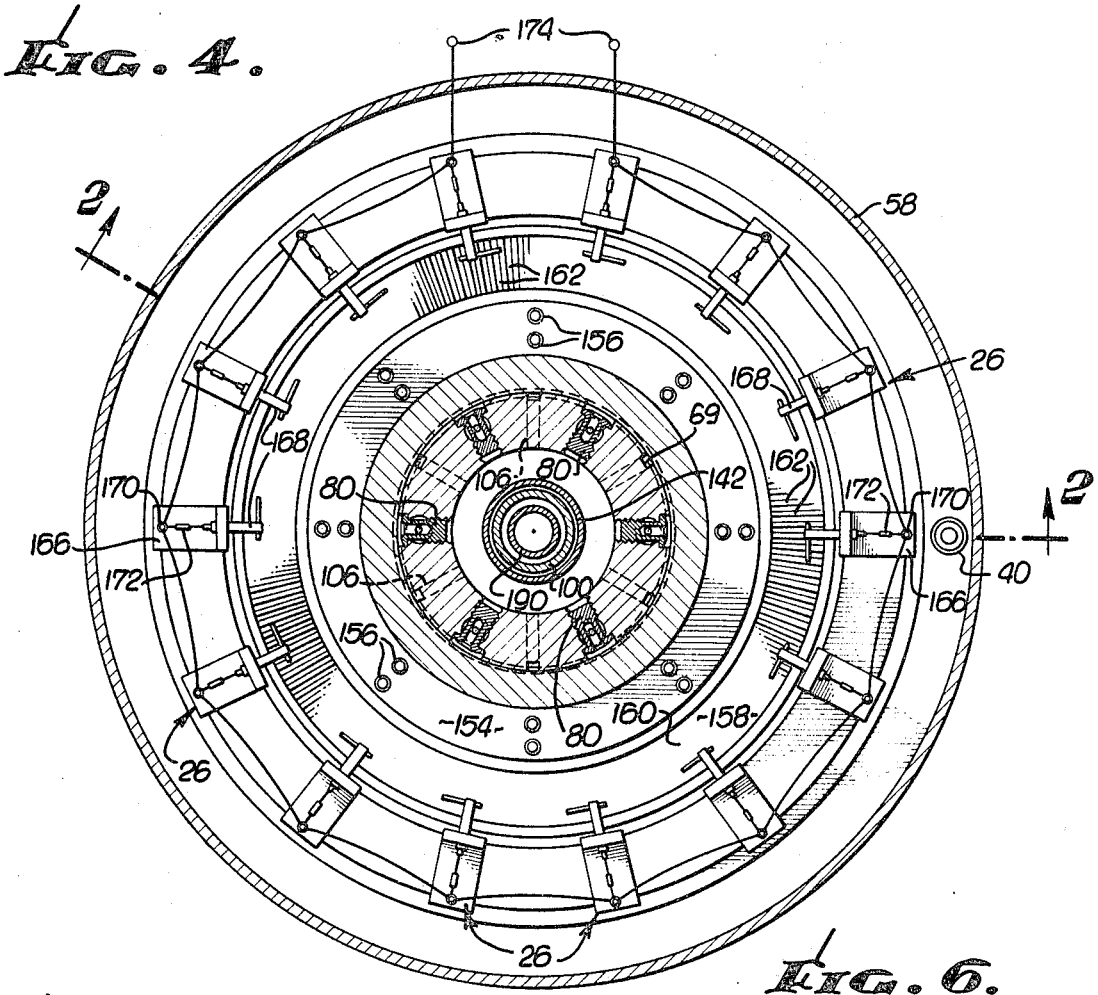
FIG. 4 is a transverse cross section view of the apparatus of FIG. 2 taken along the offset plane 4-4.

Referring to FIG. 1 of the drawings, the major components of a rate table system are shown in block diagram form. Instruments to be calibrated or tested are supported by a turntable 10 carried by a high-stiffness shaft 12 for rotation about a central axis 13. The turntable and shaft are exceedingly rugged and permit loads of 1,500 pounds and above to be carried both symmetrically and eccentrically of the central axis 13. The turntable axis 13 is shown in the vertical position but it is to be understood that with the utilization of appropriate mechanisms, well known in the art, the axis may be tilted from the vertical.

The angular motion of the turntable 10 is precisely controlled down to angular velocities of the order of 0.001 degree per second by a DC torque motor 14 directly coupled to the shaft 12. The speed of the torque motor 14 may be manually selected or automatically controlled or programmed. Generally, the motor 14 is controlled by a precision speed control 15 which includes the series combination of a reference power supply 16, an on-off and direction control switch 18 and a variably positionable divider network 20. The precision speed control circuitry 15 is coupled through serially connected integrating and power amplifiers 22 and 24 respectively to energize the motor 14.

An extremely sensitive DC tachometer 26, directly driven by the shaft 12, provides an output signal proportional to the angular velocity of table 10. The tachometer output can be recorded on a continuous basis along with the output of the instruments being calibrated or tested. The tachometer output is also utilized to regulate and stabilize the angular velocity of the torque motor 14 in velocity-feedback fashion, as shown schematically in FIG. 1 by the line 28 interconnecting the tachometer and the junction of the divider network 20 and integrating amplifier 22.

Signals generated by the instruments under test or calibration are coupled to external recording devices (not shown) through connectors 30 carried by the turntable 10 and a slip ring and brush assembly 32. Suspended under the turntable 10 is a centrifugal switch 34 suitably connected to the torque motor 14 to shut down the motor in the event of overspeed.

The analog velocity signal produced by the tachometer 26 may be supplemented by a digital signal generated by a high resolution encoder 36 actuated by the shaft 12 and providing a pulse for each given increment of turntable rotation. The encoder output may be used directly to display, in digital fashion, total angular displacement of the turntable from an arbitrary starting reference; this signal may also be combined with a time reference such as that derived from an event counter 38 to provide by differentiation an average velocity figure in digital form.

A source of error in rate table systems is the variation in temperature of critical components such as the tachometer. To compensate for this, a temperature-sensing means in the form of a thermistor 40, for example, is mounted on the tachometer 26 to measure the tachometer temperature and provide a correction signal to the reference power supply 16 as shown by the feedback line 42.

Turning to FIGS. 2—6, the mechanical portions of the system will now be described in greater detail. The turntable apparatus, which is generally symmetrical of the central axis 13 about which the turntable rotates, is mounted on a heavy baseplate 50. The base 50 supports a generally cylindrical housing 52 the upper extremity of which is turned outwardly to form a mounting flange 54. The housing 52 further includes an integral, inwardly directed flange 56. Upper and lower shrouds 58 and 60, respectively, fastened to the housing 52, form the exterior shell of the apparatus.

Secured to the base 50 and projecting upwardly therefrom concentric with the axis 13 is a tubular spindle 62 having a head portion 63 at its upper end and including an inwardly projecting flange 64 at the upper extremity. An intermediate portion 66 of the outside wall surface of the spindle is recessed thereby defining an upper radial bearing pad 68 the lower edge of which marks the lower extremity of the head portion 63. The upper pad 68 is divided into a number of segments by vertical slots 69 extending upwardly from the lower edge of the pad for a major portion of the height of the pad. A lower radial bearing pad 70 is similarly defined at the lower end of the spindle with segmenting slots 71 extending the full height of the pad. The top surface 72 of the flange 64 serves as a thrust bearing pad and includes an annular recess 74 about the periphery.

Figure 3:
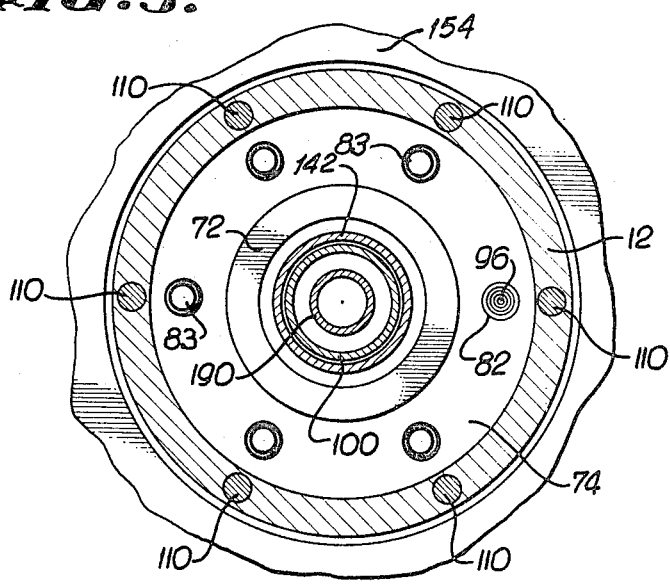
FIG. 3 is a transverse cross section view of the apparatus of FIG. 2 taken along the plane 3-3.
Figure 6:
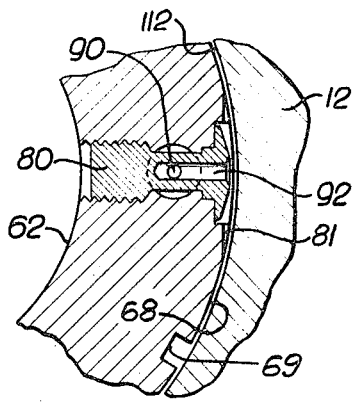
FIG. 6 is an enlarged plan view, in section, of a portion of FIG. 4 showing further details of the orifice plug of FIG. 5.

A plurality of vertical passages 76, at least three in number and preferably six, are formed at equal intervals in the wall of the spindle 62 for supplying the radial and thrust bearings with hydrostatic liquid under pressure. Liquid is introduced into the lower and upper radial bearings through flow-directing means in the form of horizontal orifice plugs 78 and 80, respectively, received by threaded openings lying intermediate the slots 69 or 71 and intersecting the vertical passages 76 and communicating with flats 81 of the upper and lower radial bearing pads 68 and 70. Liquid enters the thrust bearing through a vertically oriented orifice plug 82 threadedly received within the upper extremity of one of the passages 76. The plugs 80 in the head 63 of the spindle are in close approximation to the annular recess 74 and in communication therewith via the radial bearing gaps above the plugs 80. The upper extremity of the remaining passages 76 are closed off by sealing plugs 83, as shown in FIG. 3.

Each lower plug 78 has an inlet orifice 84 in alignment with the corresponding passage 76. The orifice 84 communicates with a horizontal axial bore 86 in the plug through which a portion of liquid entering from passage 76 via inlet orifice 84 flows to the bearing. The remaining liquid passes around an undercut 88 formed in the midsection of the plug. Each upper plug 80 defines a similar inlet orifice 90, a bore 92 and an undercut 94. The vertically oriented thrust bearing plug 82 has a single coaxial orifice 96 communicating with the annular recess 74 in the top surface of the spindle 62.

A vertical tubular member 100 having a flared lower portion 102 secured to the inner wall of the spindle 62, defines with the inner wall of the spindle an annular collection chamber 104 for receiving hydrostatic liquid discharged from the thrust bearing. A plurality of radial passages 106, extending through the wall of the spindle 62, interconnect a chamber 104 with the intermediate recessed portion 66 of the outer wall surface of the spindle.

The shaft 12 is in the form of a heavy cylindrical tube dimensioned to enclose the spindle 62 with a running fit. The shaft 12 is securely attached to the turntable 10 by a number of machine bolts 110 extending into threaded openings formed in the wall of the shaft. The inside of the shaft is provided at top and bottom with bearing surfaces 112 and 114 which match the upper and lower radial bearing pads 68 and 70 on the spindle 62. The corresponding radial bearing surfaces of the shaft and spindle have tolerances which provide clearances typically ranging between 0.001 and 0.0015 inch on the radius. The inner wall surface of the shaft 12 is recessed at 116 between the bearing surfaces 112 and 114 to match the recessed portions 66 of the spindle 62. The recessed portions of the shaft and spindle define between them a common collector or return duct 118 in the shape of a thin annulus coaxial of the axis 13. The bottom extremity of the annular duct 118 communicates with a series of angularly spaced radial conduits 120 formed in the shaft 12. The outer ends of the conduits 120 open into a reservoir 122 defined by the base 50, the housing 52 and the shaft 12. A pipe 124, extending through the lower shroud 60, is threadedly received by the housing 52 and replenishes the hydrostatic liquid in the reservoir 122 from a supply (not shown) as required. A ringlike splash plate 126 connected to the shaft 12 by setscrews 128 functions as a shield within the reservoir 122 and prevents liquid from splashing up past the shaft 12. Liquid from the reservoir 122 is circulated to the passages 76, through inlet conduits 130 formed in the base 50, by means of a pump 132.

Extending across the upper end of the shaft 12 and connected thereto is a thrust plate 136 the lower surface 138 of which forms the rotating element of the thrust bearing. The plate 136 is provided with a central opening 140 and carries a depending tube 142 surrounding the tubular member 100 to prevent the escape of any liquid by splashing or other agitation.

It will be seen that a compact, self-centering radial and thrust bearing combination has been provided within the upper end of the shaft 12 with the bearing pads and surfaces contiguous and the bearings serviced by common conduit means. The upper and lower radial bearings react to moments tending to tilt the shaft axis such as might be expected from loads eccentrically placed on the turntable 10.

In the description of operation which follows, reference will also be made to FIG. 7 which shows in somewhat simplified, schematic form, the liquid flow circuit and wherein symbols for electrical resistance are used to denote the major restrictions in the system. FIG. 7 shows, by way of example, two sets of bearings, each set including a thrust bearing, an upper radial bearing and a lower radial bearing. It is to be understood however, that typically four sets, and preferably six sets of radial bearings will be employed.

Liquid under pressure, supplied by the pump 132, is fed via the inlet passages 130 to the vertical passages 76 which are connected in parallel with the supply. Upon reaching the lower radial orifice plugs 78, the flow splits, a small portion passing through the fixed orifices 84 and the rest circumventing the plugs 78 by way of the undercut midsections 88.

Liquid passing through the orifices 84 moves radially outwardly via the bores 86, then circumferentially to the collection slots 71, some moving up in the slots to the duct 118 and the remainder moving down to the reservoir 122. The lower radial bearing clearance gap 85 is represented in FIG. 7 by variable resistance symbols. The use of these symbols for the bearing gaps is appropriate because under an eccentric load, the clearance gaps on one side will decrease while increasing on the other side. The resistance to flow will vary accordingly, of course, the smaller gaps presenting greater resistance. However, because part of the total pressure drop takes place across the fixed orifices, the balance of the total pressure drop occurring across the variable resistances (bearing gaps), variations in bearing gaps are seen as variations in pressure of the liquid in the bearing. This provides a self-centering action which cannot be achieved with mechanical bearings. Thus, when the gap on one side decreases, the increasing liquid pressure within the bearing produces a restoring force tending to recenter the shaft. Since the orifices are dimensioned for a nonlinear flow vs. $\Delta p$ characteristic, this force is nonlinear so that an exceedingly effective restoring means inheres in the bearing system described. It should be noted that the term "orifice" includes all fixed resistances to flow and includes capillaries and the like used for compensation.

Liquid passing around the orifice plugs 78 continues up the passages 76 to the upper radial orifice plugs 80 where a similar series of events takes place. Some of the liquid flows through fixed orifices 90 and then outwardly through the bores 92. The remainder, in the passage 76 terminating in the orifice plug 82, bypasses the plug 80 and flows out into the annular recess 74 through the fixed orifice 96. At least some of the liquid issuing from the orifice 96 moves radially inwardly past the surface 72 to the return side of the system through the thrust bearing gap 97. The liquid discharged from the orifice plugs 80 flows upwardly through the gap 98 and downwardly through the gap 99 and collection slots 69 in a proportion depending upon the axial load imposed upon the thrust bearing. If the downwardly directed axial load is high, the pressure within the recess 74 will be greater than the pressure in the radial bearing gaps 98 and 99 and slots 69 and therefore liquid from the thrust bearing will flow down through the gaps 98 and 99 and slots 69 to the return duct 118. All of the liquid from the upper radial orifice plugs 80 will flow down through the gap 99. Below a certain load level (which will vary depending upon various parameters including gap and fixed orifice sizes), the flow from the plugs 80 will divide, some liquid moving upwardly to recess 74 and from there to the return system via the thrust bearing gap 97. In that case, all of the flow from the thrust bearing orifice plugs will also be directed through the gap 97. The gap 98, which is common to both upper radial and thrust bearings, is represented by variable resistance symbols in FIG. 7 connected in shunt between the junction of the serially connected resistance symbols 96 and 97 and the junction of the serially connected symbols 90 and 99.

The shaft 12 has upper and lower, integrally formed flanges 150 and 152, respectively, projecting from its outer surface. The upper flange 150 carries, by means of a ring 154 and appropriate fasteners 156, the rotor 158 of the tachometer 26. As best seen in FIG. 4, the rotor 158 has an upper, planar surface 160 carrying a large number of closely spaced commutator bars 162. The stator 164 of the tachometer 26 is carried by the flange 54 of the housing 52 and carries on its upper surface a number of angularly spaced brackets 166, the upright portion of which support brush assemblies 168 which provide contact with the commutator bars of the rotor 158. The brush assemblies 168 are connected to terminals 170 through resistors 172. As shown in FIG. 4, the terminals 170 are appropriately coupled between external connection points 174 which are adapted to be connected to the appropriate recording and feedback circuitry.

The armature 180 of the motor 14 is carried by the lower flange 152 by means of a suitable clamping device 182. The ring-shaped stator 184 of the motor 14, which surrounds the armature 180, is attached to the flange 56 of the housing 52 and is connected (by means not shown) to suitable energizing circuits.

The thermistor 40 is attached to the outwardly extending portion of the tachometer stator 164 which portion secures the stator to the flange 54.

Depending from the turntable 10 and attached thereto coaxial with the vertical axis 13, is a tubular stem 190. The lower end of the stem 190 is stabilized against wobbling by means of a ball bearing 192 retained within a stationary sleeve 194 attached to the base 50. The bearing 192 is not preloaded so that no frictional drag forces are applied to the turntable 10 from this source. The upper portion of the sleeve 194, and the part of the outer surface of the stem 190 within the sleeve 194, carry the various components of the slip ring and brush assembly 32, the details of which have been omitted for clarity. It will be understood, however, that the fine wires interconnect the slip rings with the connectors 30 on top of the turntable 10 via the hollow stem 190.

The encoder 36, mounted within the lowermost portion of the sleeve 194, is driven by the stem 190 through a flexible bellows coupling device 196.

FIG. 8 illustrates, in somewhat schematic form, an alternative embodiment of the present invention including a pair of hydrostatic liquid thrust bearings adapted to react to axial loads in either direction. This apparatus includes a modified shaft 12a and a spindle 62a provided with a vertical, annular extension 200 terminating at its upper end in a radially projecting, upper thrust bearing flange 202, the lower surface 204 of which, in cooperation with the upper surface 206 of the thrust plate, forms a thrust bearing for absorbing upwardly directed forces applied to the rotatable elements of the system. A hydrostatic liquid supply passage 208 is formed in the extension 200 and flange 202 to supply a thrust bearing orifice plug 210 similar to plug 82 already described. Angularly spaced liquid return passages 212 are provided in the extension 200 and flange 202 intermediate the supply passages to receive discharged liquid from both thrust bearings and to direct that liquid to chamber 104. A tubular deflector 214 is mounted atop the thrust bearing flange 202 coaxial with the axis of rotation 13 to insure that all liquid escaping across the top of the flange is channeled into the return passages 212.

While the invention has been particularly shown and described with reference to exemplary embodiment, it will be understood by those skilled in the art that variations, changes and modifications may be made in the materials, form, details, component parts and arrangement without departing from the spirit and scope of the invention. Thus, it will be obvious that with minor modifications, the functions and/or positions of the shaft 12 and spindle 62 may be reversed with the various liquid passages and plugs 78, 80, 82 and 210 incorporated in the stationary member.

What I claim is:

1. A rate table apparatus including:
   a turntable mounted for rotation about a central axis;
   tubular shaft means coaxial of said central axis and having an end attached to said turntable;

fixed tubular spindle means disposed concentrically of said shaft means and dimensioned for a running fit therewith, said spindle means and shaft means defining between them hydrostatic thrust and radial bearings proximate said end of said shaft means, said thrust and radial bearings being contiguous and in close approximation and sharing common liquid supply and return conduit means formed in said shaft means and spindle means;

means coupled to said liquid supply conduit means for supplying liquid to said bearings under pressure;

motor means coupled to said shaft means for rotating said turntable in accordance with command signals; and means coupled to supply said command signals and including means for generating a reference signal and tachometer means coupled to said shaft means.

2. A rate table apparatus, as defined in claim 1, which includes:

a second radial bearing defined by said shaft means and spindle means and spaced from the first radial bearing whereby decentering moments are resisted, said second radial bearing sharing said common liquid supply and return conduit means.

3. A rate table apparatus, as defined in claim 1, which includes:

a second hydrostatic thrust bearing defined by said shaft means and spindle means for reacting to axial loads opposite to those resisted by the first thrust bearing, said second thrust bearing sharing said common liquid supply and return conduit means.

4. A rate table apparatus including:

a turntable mounted for rotation about a central axis;

shaft means, coaxial of said central axis, having an end attached to said turntable;

means operatively associated with said shaft means for rotating said turntable at predetermined, precise velocities and including a motor supplied by a temperature-compensated reference power supply and servo loop means including said motor and a tachometer coupled to said shaft means; and fixed spindle means disposed concentrically of said shaft means and dimensioned for a running fit therewith, said spindle means and shaft means defining between them a hydrostatic liquid thrust bearing means and first radial bearings adjacent the turntable end of said shaft means and second radial bearings distal said end of said shaft means, said thrust bearing means and first and second radial bearings being supplied by a liquid circulation system including passages and flow-directing means carried by said spindle means.

5. A rate table apparatus, as defined in claim 4, which includes:

return conduits defined by said spindle means and shaft means, said return conduits including an annular duct extending axially between said first and second radial bearings.

6. A rate table apparatus, as defined in claim 4, in which:

said spindle means includes at least three said passages extending parallel with said central axis and spaced at equal angular intervals; and said flow-directing means comprises first and second radial bearing plugs and thrust bearing plugs, said first and second radial bearing plugs being received within radial apertures intersecting said passages, each said plug including an orifice for conducting liquid to the corresponding radial bearings and dropping the pressure of said liquid and an undercut section communicating with said passage for permitting a portion of the liquid in the passage to pass around the plug, said thrust bearing plugs including an orifice for conducting liquid to the thrust bearing means, said first and second radial bearings and said thrust bearing means being connected in parallel with the pressure side of said liquid circulation system.

7. A rate table apparatus, as defined in claim 4, in which:

said shaft means comprises a tubular member enclosing said spindle means;

said means for rotating said turntable comprises an electric motor having an annular armature disposed about and secured to the tubular shaft means; and which apparatus includes:

tachometer means having an annular rotor disposed about and secured to said tubular shaft means.

8. A rate table system including:

a turntable including a depending, hollow cylindrical shaft means having contiguous internal thrust and radial bearing surfaces perpendicular to one another;

torque motor means operatively associated with said shaft means for rotating said turntable in accordance with input commands to said torque motor means;

tachometer means operatively associated with said shaft means for providing an output signal indicative of the angular velocity of said turntable and including a rotor secured to said shaft means and a stator disposed about said rotor;

temperature-sensing means mounted on said tachometer stator;

servo loop means interconnecting said torque motor means and said tachometer means for regulating the angular velocity of the turntable, said temperature sensing means being connected to said servo loop means to introduce a temperature correction signal to said loop means; and cylindrical spindle means projecting into said hollow cylindrical shaft means and dimensioned for a running fit therewith and having external thrust and radial bearing pads adjacent corresponding thrust and radial bearing surfaces of said shaft means, said spindle means further having passages formed therein for circulating liquid to said bearings under pressure.

9. A rate table system for testing and calibrating instruments, including:

a turntable for supporting said instruments and including connector means for coupling to the outputs of said instruments, said turntable being mounted for rotation about a central axis;

a tubular shaft, coaxial of said axis, depending from said turntable;

motor means operatively associated with said shaft for rotating said shaft and turntable in accordance with command signals;

a fixed, tubular spindle disposed concentrically inside said shaft and dimensioned for a running fit therewith, said spindle and shaft defining between them a hydrostatic thrust bearing proximate said turntable and a hydrostatic radial bearing means at least a portion of which radial bearing means is positioned close to said thrust bearing, said spindle and shaft including conduit means for circulating liquid to and from said thrust bearing and radial bearing means;

a hollow stem depending coaxially from said turntable within said spindle; and a slip ring and brush assembly operatively associated with said stem for coupling said connector means, via said hollow stem, to external recording devices.

10. A rate table system for testing and calibrating instruments, including:

a turntable for carrying said instruments and including means for connection to the outputs of said instruments, said turntable mounted for rotation about a central axis;

a tubular shaft, coaxial of said axis, attached to and depending from said turntable, said shaft having adjacent, contiguous internal thrust and upper radial bearing surfaces perpendicular to one another and proximate the end of said shaft attached to said turntable, and lower radial bearing surfaces distal said upper radial bearing surfaces;

an annular torque motor coupled to the exterior surface of said shaft for rotating said turntable in accordance with input commands to said torque motor;

an annular tachometer coupled to the exterior surface of said shaft for providing an output signal indicative of the angular velocity of said turntable and including a rotor secured about the exterior surface of the shaft and a stator disposed about said rotor;

a thermistor mounted on said tachometer stator, said tachometer being connected in velocity-feedback fashion to the input of said torque motor, the output of said thermistor being connected to the input of said torque motor to introduce a temperature correction feedback signal;

a fixed, tubular spindle disposed concentrically inside said shaft and dimensioned for a running fit therewith, said spindle having external bearing pads corresponding to the thrust, upper radial and lower radial bearing surfaces of said shaft, said shaft and spindle defining liquid circulation conduit means including at least three equally spaced, axially oriented liquid supply passages formed in the wall of the spindle and extending the full length thereof, a chamber within said spindle for receiving liquid discharged from said thrust bearing, a plurality of radial discharge passages through the walls of said spindle and said shaft, and an annular duct defined by the spindle and shaft and extending axially between said upper and lower radial bearings and interconnecting the radial discharge passages in the spindle wall with the radial discharge passages in the shaft wall;

orifice plugs mounted in the wall of said spindle within radial apertures intersecting said supply passages for supplying liquid to said upper and lower radial bearings, said orifice plugs including pressure reducing orifices in communication with said passages, said orifice plugs further defining means for bypassing a portion of the fluid in said passages around said plugs whereby said orifices are connected in parallel with said passages, radially oriented bores in said plugs interconnecting said orifices with said radial bearings;

an axially extending orifice plug mounted within the upper extremity of one of said passages for supplying said thrust bearing, said plug including an axial orifice interconnecting said passage with said thrust bearing;

axially extending sealing plugs mounted in the upper extremities of the remaining passages;

a pump;

an annular reservoir, disposed about said shaft, for holding a supply of liquid and connected in series with said pump, said supply passages in said spindle wall being connected in parallel with said pump, said radial discharge passages in said shaft wall being in communication with said reservoir to return liquid thereto;

a tubular stem depending from said turntable coaxially therewith and extending downwardly into said spindle;

unloaded bearing means disposed between said spindle and the lower end of said stem for stabilizing said stem during rotation; and a slip ring and brush assembly coupled to said stem for connecting said instrument connection means on said turntable via said stem, to external recording devices.

11. A rate table system, as defined in claim 11, in which:
the thrust bearing reacts against downwardly directed loads; and which system includes:

second thrust bearing surfaces and pads, transverse of said axis, defined by said shaft and said spindle, respectively, forming a second thrust bearing for reacting against upwardly directed loads;

an extension to one of said supply passages formed in said spindle for supplying liquid to said second thrust bearing;

an orifice plug in said passage extension for directing liquid to said second thrust bearing; and generally axially oriented discharge conduit means formed in said spindle for receiving liquid discharged from said second thrust bearing and conducting said liquid to said chamber.

12. A rate table apparatus including:
a turntable mounted for rotation about a central axis;
shaft means, coaxial of said central axis, having an end attached to said turntable;
means operatively associated with said shaft means for rotating said turntable at predetermined velocities; and
fixed spindle means disposed concentrically of said shaft means and dimensioned for a running fit therewith, said spindle means and shaft means defining between them a hydrostatic liquid thrust bearing means and first radial bearings adjacent the turntable end of said shaft means and second radial bearings distal said end of said shaft means, said thrust bearing means and first and second radial bearings being supplied by a liquid circulation system including at least three passages in said spindle means extending parallel with said central axis and spaced at equal angular intervals and flow-directing means comprising first and second radial bearing plugs and thrust bearing plugs, said first and second radial bearing plugs being received within radial apertures intersecting said passages, each said plug including an orifice for conducting liquid to the corresponding radial bearings and dropping the pressure of said liquid and an undercut section communicating with said passage for permitting a portion of the liquid in the passage to pass around the plug, said thrust bearing plugs including an orifice for conducting liquid to the thrust bearing means, said first and second radial bearings and said thrust bearing means being connected in parallel with the pressure side of said liquid circulation system, 13. A rate table apparatus including:
a turntable mounted for rotation about a central axis;
tubular shaft means, coaxial of said central axis, having an end attached to said turntable;
an electric motor for rotating said turntable at predetermined velocities and having an annular armature disposed about and secured to the tubular shaft means;
fixed spindle means disposed concentrically of and enclosed by said shaft means and dimensioned for a running fit therewith, said spindle means and shaft means defining between them a hydrostatic liquid thrust bearing means and first radial bearings adjacent the turntable end of said shaft means and second radial bearings distal said end of said shaft means, said thrust bearing means and first and second radial bearings being supplied by a liquid circulation system including passages and flow-directing means carried by said spindle means; and
tachometer means having an annular rotor disposed about and secured to said tubular shaft means.

14. A rate table system including:
a turntable including depending shaft means having contiguous thrust and radial bearing surfaces perpendicular to one another;
torque motor means operatively associated with said shaft means for rotating said turntable in accordance with input commands to said torque motor means;
tachometer means operatively associated with said shaft means for providing an output signal indicative of the angular velocity of said turntable;
servo loop means interconnecting said torque motor means and said tachometer means for regulating the angular velocity of the turntable;
fixed spindle means operatively associated with said shaft means and dimensioned for a running fit therewith and having thrust and radial bearing pads adjacent corresponding thrust and radial bearing surfaces of said shaft means, said spindle means further having passages formed therein for circulating liquid to said bearings under pressure; and
means connected to said passages for supplying said bearings with liquid under pressure.

15. A rate table system, as defined in claim 14, which includes:

means coupled to said tachometer for sensing the temperature thereof and having an output connected to said servo loop means to introduce a temperature correction signal.

16. A rate table system for testing and calibrating instruments, including:

a turntable for supporting said instruments and including connector means for coupling to the outputs of said instruments, said turntable being mounted for rotation about a central axis;

a shaft, coaxial of said axis, depending from said turntable;

motor means operatively associated with said shaft for rotating said shaft and turntable in accordance with command signals;

means coupled to supply said command signals and including means for generating a reference signal and tachometer means coupled to said shaft;

a fixed spindle disposed concentrically of said shaft and dimensioned for a running fit therewith, said spindle and shaft defining between them a hydrostatic thrust bearing proximate said turntable and a hydrostatic radial bearing means at least a portion of which radial bearing means is positioned close to said thrust bearing, said spindle and shaft including conduit means for circulating liquid to and from said thrust bearing and radial bearing means; and a slip ring and brush assembly operatively associated with said shaft for coupling said connector means to external recording devices.

17. A rate system, as defined in claim 16, which includes:

an encoder coupled to said shaft and providing a digital output representing the total angular displacement of said turntable from a starting reference.

18. A rate table apparatus including:

a turntable for supporting instruments for testing and calibration and rotatable about a central axis;

shaft means disposed coaxial of said central axis and having an end attached to said turntable;

precision drive means coupled to said shaft means;

fixed spindle means operatively associated with said shaft means and dimensioned for a running fit therewith, said spindle means and shaft means defining between them hydrostatic thrust and radial bearings proximate the turntable end of said shaft means, said thrust bearing including two opposed, axially spaced, radially extending bearing surfaces on said spindle means and two corresponding, radially extending bearing surfaces on said shaft means; and a liquid circulation system including passages and flow-directing means defined and carried by said spindle means for supplying liquid under pressure to said thrust and radial bearings.

19. A rate table apparatus, as defined in claim 18, in which:

said shaft means comprises a tubular member, said radially extending bearing surfaces on said shaft means are defined by an inwardly directed flange forming an integral part of said shaft means; and said radially extending bearing surfaces on said spindle means are defined by an annular recess receiving said inwardly directed flange.